United States Patent [19]

Sadaki

[11] Patent Number: 5,734,410
[45] Date of Patent: Mar. 31, 1998

[54] THERMAL TRANSFER RECORDING APPARATUS AND METHOD FOR REGULARLY ASSIGNING BLANK DOTS

[75] Inventor: Akihiro Sadaki, Tokyo, Japan

[73] Assignee: Seiko Instruments Inc., Japan

[21] Appl. No.: 717,219

[22] Filed: Sep. 26, 1996

Related U.S. Application Data

[63] Continuation of Ser. No. 302,502, Sep. 8, 1994, Pat. No. 5,646,671.

[30] Foreign Application Priority Data

Sep. 10, 1993 [JP] Japan ................... 5-226097

[51] Int. Cl.$^6$ ................... B41J 2/32; B41J 2/325
[52] U.S. Cl. ................... 347/176
[58] Field of Search ................... 347/171, 172, 347/173, 174, 176, 9, 12, 13, 15, 43; 400/120.02, 120.04; 358/503, 517

[56] References Cited

U.S. PATENT DOCUMENTS 4,250,511  2/1981  Stein et al. ................... 347/176

Primary Examiner—Huan H. Tran
Attorney, Agent, or Firm—Adams & Wilks

[57] ABSTRACT

By using a recording method in which a different plurality of blank dots are printed for each color in a thermal transfer recording apparatus, a printed sheet does not have visually recognizable white dots which are seen as high frequency noise, thereby creating a high quality printing record. Such thermal transfer recording apparatus has a conversion table for receiving a line display signal, a signal indicating whether a color density signal corresponds to an odd-numbered line or to an even-numbered line and an identification signal for identifying a respective color, and outputs a print signal for each color. The print signal converted by the conversion table indicates the locations of blank dots for each respective color, and different blank dots are assigned for each different color, thereby realizing a superior image quality.

34 Claims, 8 Drawing Sheets

| INPUT | | | | OUTPUT |
|---|---|---|---|---|
| D_IN(7:0) | EVENLINE | EVENDOT | COLOR(1:0) | D_OUT(7:0) |
| D(7:0) | H | H | L, L | 00h |
| D(7:0) | H | L | L, L | D(7:0) |
| D(7:0) | L | H | L, L | D(7:0) |
| D(7:0) | L | L | L, L | D(7:0) |
| D(7:0) | H | H | L, H | D(7:0) |
| D(7:0) | H | L | L, H | 00h |
| D(7:0) | L | H | L, H | D(7:0) |
| D(7:0) | L | L | L, H | D(7:0) |
| D(7:0) | H | H | H, L | D(7:0) |
| D(7:0) | H | L | H, L | D(7:0) |
| D(7:0) | L | H | H, L | 00h |
| D(7:0) | L | L | H, L | D(7:0) |
| D(7:0) | H | H | H, H | D(7:0) |
| D(7:0) | H | L | H, H | D(7:0) |
| D(7:0) | L | H | H, H | D(7:0) |
| D(7:0) | L | L | H, H | 00h |

FIG. 2

THERMAL TRANSFER RECORDING APPARATUS AND METHOD FOR REGULARLY ASSIGNING BLANK DOTS

This is a continuation of application Ser. No. 08/302,502 filed Sep. 08, 1994 U.S. Pat No. 5,646,671.

BACKGROUND OF THE INVENTION

The present invention relates to a thermal transfer recording apparatus and method for thermally transferring ink on an ink sheet onto recording paper and to a performing multicolor display.

Conventionally, a variety of apparatuses and methods for multicolor printing with a thermal transfer recording apparatus have been realized.

FIG. 6 is an explanatory diagram showing a printing mechanism used in a thermal transfer recording apparatus, and hereinafter of this mechanism operation will be explained in connection with fusion type thermal transfer.

An ink sheet 21 and a sheet of recording paper 22 are carried so as to be sandwiched between a thermal head 23 and a platen 24. The thermal head 23 is pressed against the platen 24 so that the ink sheet 21 and heat generating resistive members of the thermal head 23 contact each other satisfactorily. The recording paper 22 is carried so as to be sandwiched between a capstan roller 25 and a pinch roller 26. The capstan roller 25 is normally/reversely rotated by a driving motor which is not shown in FIG. 6 while the capstan roller 25 is pressed against the pinch roller 26, thereby feeding the recording paper 22 forward/backward. In the above state, while the capstan roller 25 is normally rotated to feed the recording paper 22, the thermal head 23 is energized to fuse ink on the ink sheet 21 and transfer the ink onto the recording paper 22. Then, the ink sheet 21 is peeled off the recording paper 22. Generally, yellow is printed first, and then the capstan roller 25 and the platen 24 are reversely rotated to carry the recording paper 22 back to a first position. Next, magenta and cyan are printed on the yellow in this sequence in the same way as described above so as to pile the three colors, thereby realizing multicolor printing.

A fusion-type binary recording apparatus displays each dot in accordance with respective binary signals (ON, OFF) for three colors including cyan, magenta and yellow, so that a density pattern method, a systematic dither method and so on are applied to obtain an image with a desired density level. In the density pattern method, dots are arranged in a matrix such as a two by two or four by four matrix and pseudogradation is obtained in accordance with an area ratio to display one pixel. In the systematic dither method, one pixel is displayed with one dot while each dot is multiplied by a dither matrix to obtain psedogradation. Therefore, printing time is so short that print recording can be performed at a low running cost.

However, it is necessary to arrange a matrix in a larger size in order to increase the number of colors to be displayed. For example, a matrix size of 16 by 16 is required to record each color in 256 density levels. When one pixel is displayed with this matrix of 16 by 16, if a resolution of the thermal head is 300 dpi, a size of the matrix becomes approximately 1.4 square mm. Therefore, this case has a defect that gradation of a small image in a halftone cannot be displayed satisfactorily.

In a sublimation type recording apparatus, a density level can be changed at the pixel level. Therefore, if the ink sheet is composed of three colors: cyan, magenta and yellow, when each color is recorded in n density levels, n cubed kinds of colors can be displayed for each pixel. If each color is recorded in, for instance, 256 density levels, approximately 16,700,000 colors can be displayed. Therefore, this type of apparatus can achieve clean printing and is frequently used for the printing of images. However, it has defects of long print time, high running cost and so on.

The sublimation type recording apparatus can change a density level one pixel by one pixel. On the other hand, the fusion type multi-density level recording apparatus can change an area onto which ink is transferred by the pixel. When the ink sheet includes three colors of cyan, magenta and yellow, if each color is recorded in n density levels, n cubed different colors can be displayed for each pixel. If each color is recorded in, for instance, 256 density levels, approximately 16,700,000 colors can be displayed. Therefore, the fusion type apparatus can achieve clear printing and is frequently used for the printing of images as well as the sublimation type in. However, it has a defect in that print recording takes longer than the fusion type binary recording apparatus.

FIG. 7 is a graph showing density level characteristics which are observed when a line cycle for energizing a thermal head is 10 ms and 3.5 ms respectively. A line cycle of 3.5 ms is a general time taken to print a sheet in 60 seconds with the fusion type binary record apparatus. In this graph, the horizontal axis represents a color density signal of image data to be printed, and the vertical axis represents a percentage dot area of ink transferred. As is apparent from the graph, when the line cycle is 10 ms, a satisfactory density level characteristic can be obtained. On the other hand, when the line cycle is 3.5 ms, while image data is between 11h and 88h, a satisfactory density level characteristic can be obtained. However, when the image data is beyond 88h, dot-join rapidly occurs, when the image data becomes 99h or AAh, a percentage dot area rapidly increases; and when beyond AAh, dots become almost crushed. Therefore, a successive density level characteristic cannot be obtained while the percentage dot area is between 60% and 90%.

The cause of a rapid occurrence of the dot join phenomenon is that the thermal head and the ink sheet accumulate heat because of the fast line cycle and even the ink originally not intended to be transferred is likely to be transferred onto the recording paper, which cannot be improved by precise control of an energizing pulse width of the thermal head. In order to obtain a desirable successive density level by preventing the dot join, there are regularly provided dots which are not printed, for instance, two dots or one dot among every four dots in a 2×2 matrix, and the dots to be printed are driven with a large energy, thereby thermally diffusing printing ink around the dots and filling up an unprinted dot region with the diffused ink.

FIGS. 8A and 8B are diagrams showing an example in which one dot among every four dots is not printed and the other three dots are used for density-level recording. An energy amount of the three dots is controlled with the identical color density signal so that a percentage area becomes the same as that of an ordinary density level recording, thereby obtaining a satisfactory density level characteristic.

When a single color is printed by a conventionally proposed method for preventing dot join, a satisfactory density level characteristic can be obtained. However, when cyan, magenta and yellow are overlaid one on top of another for multicolor printing by this method, white dots, that is, unprinted dots on recording paper which exist regularly for all the colors to be displayed are visually recognized as noise of high frequency and deteriorate image quality remarkably.

When even a single color is printed, regular white dots exist on the recording paper as well as for multicolors, however, the amount of noise which is recognizable is so small that printing quality does not deteriorate. As the number of colors to be displayed for multicolor printing increases, the amount of white dots recognized as noise seems to increase, the cause of which is presently unclear.

SUMMARY OF THE INVENTION

An object of the present invention is to provide a thermal transfer recording apparatus and method for preventing the occurrence of before white dots which are visually recognizable as high frequency noise from appearing on recording paper so as to realize printing of high quality.

In order to solve the above problems, in one aspect the thermal transfer recording apparatus according to the present invention comprises: a thermal head including a number of heat generating resistive members; a platen for pressing a sheet of recording paper and an ink sheet against the thermal head; a mechanism for carrying the recording paper; a mechanism for feeding and taking up the ink sheet; a conversion or masking means for receiving a line display signal showing to which line a color density signal corresponds to and an identification signal of each color, and for outputting a print signal in response to the inputted signals for each color corresponding; and a driving circuit for selectively energizing the heat generating resistive members in accordance with the print signal. The print signal outputted from the conversion means has dots not to be printed for each color and different dots are assigned not to be printed depending on respective colors.

Further, a thermal transfer recording method according to the present invention comprises three steps of:

(a) providing first print information specifying a plurality of first specific dots of a first color which are to be printed on at least on one line and specifying locations on the at least one line where no first specific dots are to be printed in the first color, and printing in the first color in accordance with the print information including the first specific dots;

(b) providing second print information specifying a plurality of second specific dots of a second color which are to be printed on the at least one line other than the first specific dots the printed image, and, and printing in the second color in accordance with the print information including the second specific dots; and (c) providing third print information specifying a plurality of third specific dots of a third color which are be printed on the at least one line other than the second specific dots based upon logical combinations of, and printing with the third color in accordance with the print information including the third specific dots.

In the thermal transfer recording apparatus and method with the above-mentioned structure, and steps the print signal includes locations at which dots are not to be printed for each color, and the locations at which dots are assigned not to be printed differs depending on the respective colors. Thereby, white dots which are visually recognized as high frequency noise do not appear on the recording paper, and a printing record of high quality can be obtained. Further, ordinary structures of a printing mechanism and a driving circuit of a thermal head can be applied without significant modification.

BRIEF DESCRIPTION OF THE DRAWINGS

FIG. 2 is a truth table showing the results of a conversion made by a means for converting a color density signal of into print information in the thermal transfer recording apparatus according to the present invention.

DETAILED DESCRIPTION OF THE PREFERRED EMBODIMENTS

Hereinafter embodiments of the present invention will be explained with reference to the attached drawings.

Figure 1:
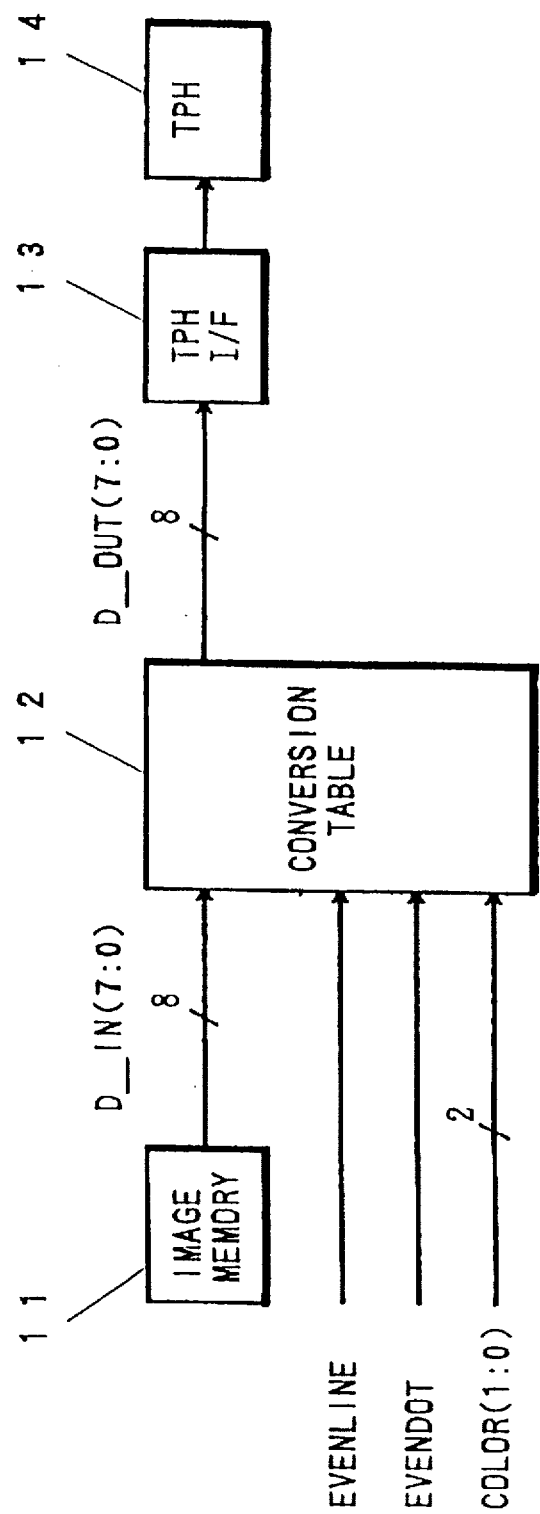
FIG. 1 is an explanatory diagram showing a means for converting a color density signal into print information in the thermal transfer recording apparatus according to the present invention.

FIG. 1 is an explanatory diagram showing a means for converting a color density signal of a thermal transfer recording apparatus according to the present invention.

In FIG. 1, an image memory 11 is a memory for temporarily storing image data input from an interface circuit which is not shown in FIG. 1. A conversion table 12 receives, as input signals, a color density signal of 8 bits, D_IN(7:0) which is output from the image memory 11, and an EVENLINE signal, an EVENDOT signal and a COLOR (1:0) signal of 2 bits, and outputs a corresponding printing signal, D_OUT(7:0) of 8 bits according to a truth table shown in FIG. 2. In this embodiment, the EVENLINE signal is a status signal which inputs an H signal into the conversion table 12 to print an even-numbered line and inputs an L signal to print an odd-numbered line. The EVENDOT signal is a status signal which inputs an H signal into the conversion table 12 to print an even-numbered dot and inputs an L signal to print an odd-numbered dot. Further, the COLOR(1:0) signal is, as shown below, a status signal of 2 bit length which inputs, into the conversion table 12, color information about printing:

| black = (L, L) | yellow = (L, H) |
| magenta = (H, L) | cyan = (H, H) |

A TPH I/F 13 is a thermal printer head interface for converting the printing signal, D_OUT(7:0) which is outputted from the conversion table 12 correspondingly with the color density signal, D_IN(7:0), into an energizing signal for a thermal head and for transferring the converted signal to the thermal printer head (hereinafter referred to as "TPH") 14 synchronously with a recording paper feeding mechanism not shown in FIG. 1.

The TPH 14 selectively energizes heat generating resistive members with the energizing signal which is inputted from the TPH I/F 13 and a control signal.

A concrete example of conversion and printing by the inventive thermal transfer recording method and with the inventive thermal transfer recording apparatus will now be given with reference to FIGS. 1 to 5B. FIGS. 3A–3D and 4 are explanatory views for explaining results of printing. FIGS. 5A and 5B are is a flowchart showing a concrete process for the thermal transfer recording method.

As an example, a case will be explained in which the color density signal outputted from the image memory 11 is data-converted by a 2×2 matrix. Three colors are printed one color after another in the sequence of yellow, magenta and cyan.

In order to print yellow first, a COLOR(1:0) signal, (L, H) is given to the conversion table 12. First in order to convert a line 0, which is an even-numbered line, an EVENLINE signal "H" is given to the conversion table 12. Then, in order to convert a dot 0, which is an even-numbered dot, an EVENDOT signal "H" is given to the conversion table 12. In this state, according to a truth table in FIG. 2, a color density signal of the line 0 and the dot 0, D_IN(7:0) is converted into a print signal, D_OUT(7:0) through the conversion table 12, that is, the same signal as the color density signal input from the image memory 11 is output as the print signal even after the conversion.

Next, in order to convert a dot 1, which is an odd-numbered dot, an EVENDOT signal "L" is given to the conversion table 12. According to the truth table in FIG. 2, a color density signal of the line 0 and the dot 1 is converted through the conversion table 12 into 00h, that is, blank data not to be printed. Then, in order to convert a dot 2, which is an even-numbered dot as well as the dot 0, an EVENDOT signal "H" is given to the conversion table 12. A color density signal, D_IN(7:0) is converted into a print signal, D_OUT(7:0), that is, the same signal as the input color density signal is output as the print signal even after it is converted. Then, in order to convert a dot 3, which is an odd-numbered dot as well as the dot 1, an EVENDOT signal "L" is given to the conversion table 12 to convert a color density signal into a print signal 00h similarly. Hereafter, similarly a color density signal is converted into a print signal as to a dot 4 and a dot 5 sequentially. When the conversion finishes, the print signals are converted through the TPH I/F 13 into energizing signals, which drive the TPH 14 to print the line 0. (The above corresponds to S1 in FIG. 5A.)

Next, in order to convert a line 1, which is an odd-numbered line, an EVENLINE signal "L" is given to the conversion table 12. In this state, according to the truth table in FIG. 2, a color density signal of every dot on the line 1, D_IN(7:0) is converted into a print signal D_OUT (7:0) through the conversion table 12, that is, the same signal as the input color density signal is output as the print signal as to all the dots even after they are converted. When the conversion operation finishes, the print signals are converted through the TPH I/F 13 into energizing signals, which drive the TPH 14 to print the line 1. (The above corresponds to S2 in FIG. 5A.)

Next, a line 2 is converted in the same manner as the line 0 to print the line 2, and a line 3 is converted as well as the line 1 to print the line 3. Hereafter, even-numbered lines and odd-numbered lines are converted to print them similarly. In order to print magenta secondly, a COLOR(1:0) signal, (H, L) is given to the conversion table 12. First, in order to convert the line 0, which is an even-numbered line, an EVENLINE signal "H" is given to the conversion table 12. In this state, according to the truth table in FIG. 2, a color density signal of every dot on the line 0, D_IN(7:0), is converted into a print signal D_OUT(7:0) through the conversion table 12, that is, the same signal as the input color density signal is output as the print signal as to every dot. When the conversion operation finishes, the print signals are converted through the TPH I/F 13 into energizing signals, which drive the TPH 14 to print the line 0. (The above corresponds to S4 in FIG. 5A.)

Next, in order to convert the line 1, which is an odd-numbered line, an EVENLINE signal "L" is given to the conversion table 12. Then, in order to convert the dot 0, which is an even-numbered dot, an EVENDOT signal "H" is given to the conversion table 12. In this state, according to the truth table in FIG. 2, a color density signal of the line 1 and the dot 0 is converted through the conversion table 12 into 00h, which indicates blank data not to be printed. Then, in order to convert the dot 1, which is an odd-numbered dot, an EVENDOT signal "L" is given to the conversion table 12. In this state, according to the truth table in FIG. 2, a color density signal of the line 1 and the dot 1, D_IN(7:0) is converted into a print signal, D_OUT(7:0) through the conversion table 12, that is, the same signal as the input color density signal is output as the print signal. Then, in order to covert the dot 2, which is an even-numbered dot in the same manner as the dot 0, an EVENDOT signal "H" is given to the conversion table 12, and a color density signal is converted into a print signal, 00h similarly. Then, in order to convert the dot 3, which is an odd-numbered dot in the same manner as the dot 1, an EVENDOT signal "L" is given to the conversion table 12. A color density signal, D_OUT (7:0), which is, the same signal as the input color density signal is output as the print signal. Hereinafter, a color density signal is similarly converted into a print signal for the dot 4 and the dot 5 sequentially. When the conversion operation finishes, the print signals are converted through the TPH I/F 13 into energizing signals, which drive the TPH 14 to print the line 1. (The above is corresponding to S5 in FIG. 5A.)

Figure 3A:
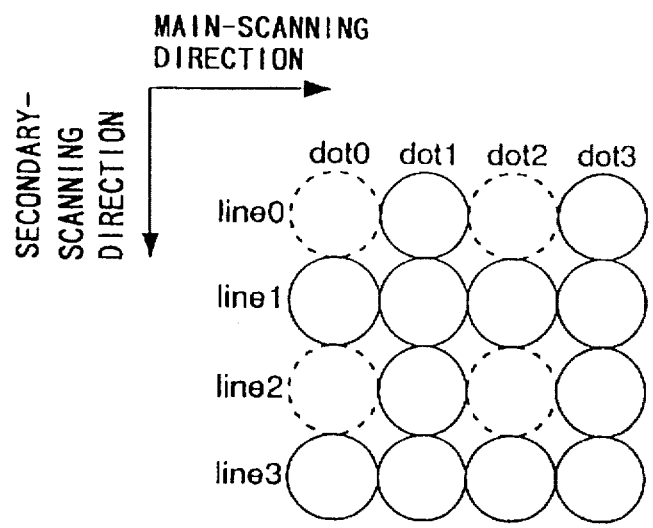
FIGS. 3A-3D are explanatory diagrams showing what is print-recorded with a means for converting a color density signal into print information in the thermal transfer recording apparatus according to the present invention.
Figure 3B:
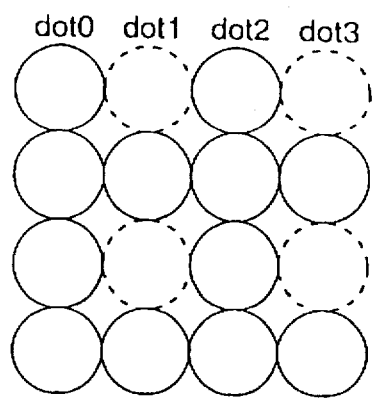
Figure 3C:
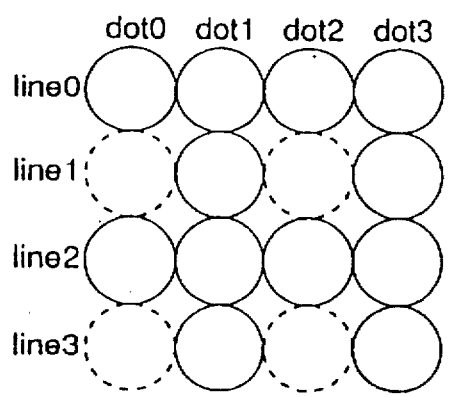

Next, the line 2 is converted similarly as the line 0 to print the line 2, and the line 3 is converted as well as the line 1 to print the line 3. Hereinafter, even-numbered lines and odd-numbered lines are printed respectively in the same way as described above. After all the lines are printed, print of magenta completes. (The above corresponds to S6 in FIG. 5A.) FIG. 3(c) shows a print state which is observed when the print of magenta finishes. In FIG. 3(c), circles in solid lines indicate printed dots and circles in broken lines indicate unprinted dots.

In order to print cyan finally, a COLOR(1:0) signal, (H, H) is given to the conversion table 12. First, in order to convert the line 0, which is an even-numbered line, an EVENLINE signal "H" is given to the conversion table 12. In this state, according to the truth table in FIG. 2, a color density signal of every dot on the line 0, D_IN(7:0) is converted into a print signal, D_OUT(7:0) through the conversion table 12, that is, the same signal as the inputted color density signal is outputted as the print signal even after the conversion. When the conversion operation finishes, the printing signals are converted through the TPH I/F 13 into energizing signals, which drive the TPH 14 to print the line 0. (The above corresponds to S7 in FIG. 5A.)

Next, in order to convert the line 1, which is an odd-numbered line, an EVENLINE signal "L" is given to the conversion table 12. Then, in order to convert the dot 0, which is an even-numbered dot, an EVENDOT signal "H" is given to the conversion table 12. In this state, according to the truth table in FIG. 2, a color density signal of the line 1 and the dot 0, D_IN(7:0) is converted into a print signal, D_OUT(7:0), that is, the same signal as the inputted color density signal is outputted as the print signal. Next, in order to convert the dot 1, which is an odd-numbered dot, an EVENDOT signal "L" is given to the conversion table 12. In this state, according to the truth table in FIG. 2, a color density signal of the line 1 and the dot 1 is converted into 00h through the conversion table 12, which means that the color density signal is converted into blank data that is not to be printed. Next, in order to convert the dot 2, which is an even-numbered dot like dot 0, an EVENDOT signal "H" is given to the conversion table 12. Similarly, a color density signal, D_IN(7:0) is converted into a print signal, D_OUT (7:0), that is, the same signal as the inputted color density signal is outputted as the print signal even after the conversion. Next, in order to convert the dot 3, which is an odd-numbered, an EVENDOT signal "L" is given to the conversion table 12. A color density signal is similarly converted into 00h. Hereafter, similarly a color density signal is converted into a print signal as to the bit 4 and the bit 5 sequentially. When the conversion operation finishes, the print signals are converted through the TPH I/F 13 into energizing signals, which drive the TPH 14 to print the line 1. (The above corresponds to S8 in FIG. 5B.)

Figure 3D:
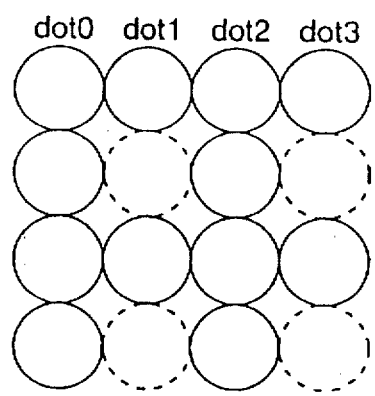

As a next step, the line 2 is converted as the line 0 to print the line 2, and the line 3 is converted as the line 1 to print the line 3. Hereafter, similarly even-numbered lines and odd-numbered lines are printed, and after all the lines are printed, print of cyan finishes. (The above corresponds to S9 in FIG. 5B.) FIG. 3(D) shows a print state which is observed when the print of cyan finishes. In FIG. 3(D), circles in solid lines represent printed dots, and circles in broken lines represents unprinted dots.

When printing in four overlaid colors, the yellow, magenta and cyan are sequentially printed, followed by the printing of black. In this state, a COLOR(1:0) signal, (L, L) is given to the conversion table 12, and according to the truth table in FIG. 2, the same conversion and print routine as described above is performed.

Figure 4:
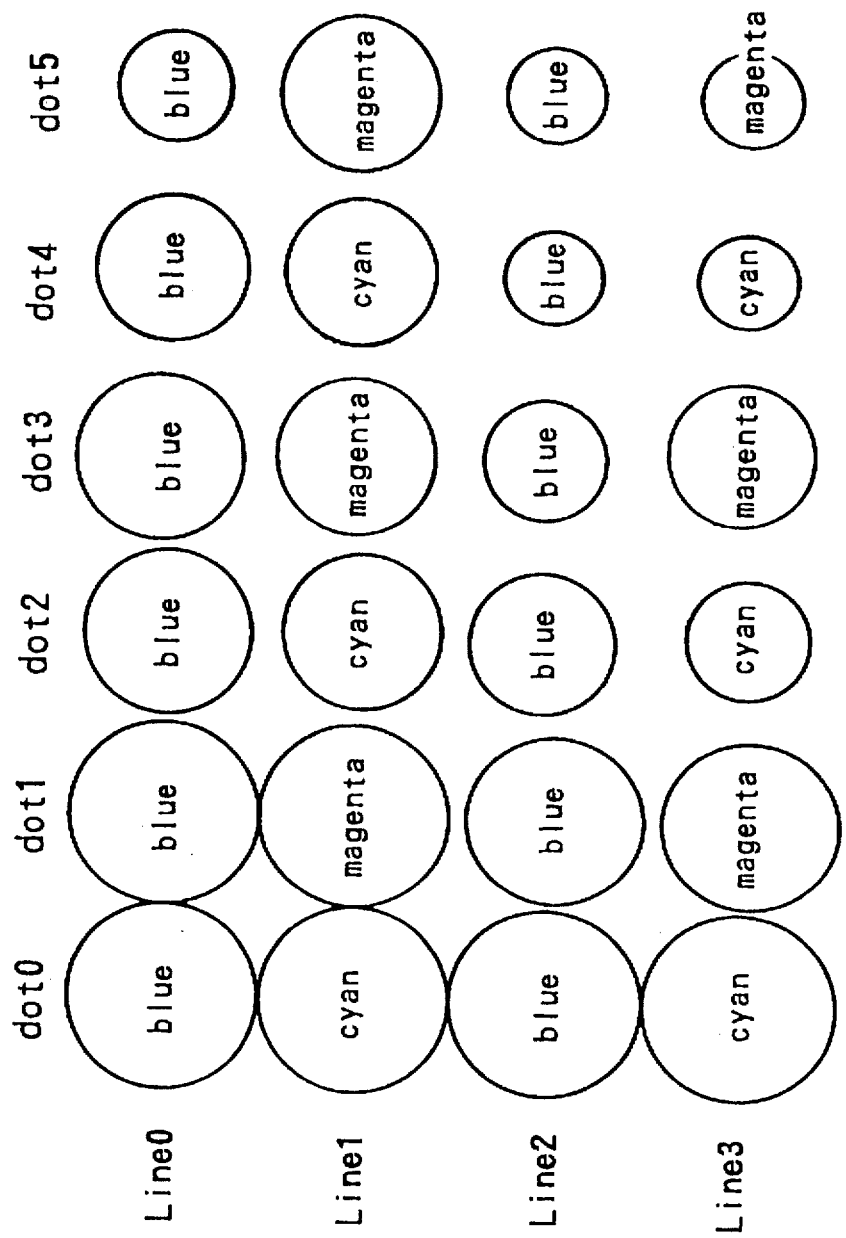
FIG. 4 is an explanatory diagram showing an example of printing with a means for converting a color density signal into print information in the thermal transfer recording apparatus according to the present invention.
Figure 5A:
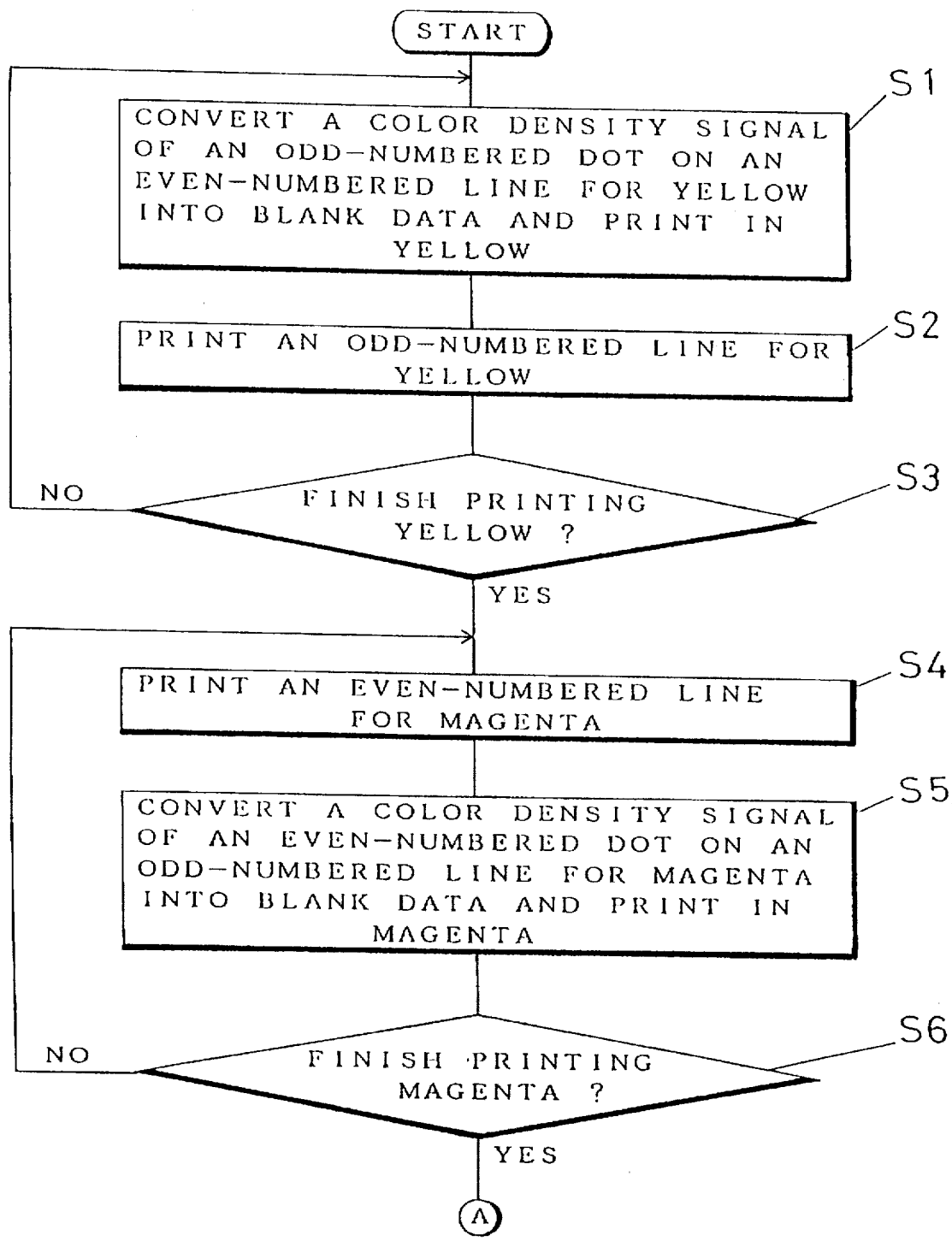
FIGS. 5A and 5B are is a flowchart showing a method for printing by converting a color density signal into print information in a thermal transfer method according to the present invention.
Figure 5B:
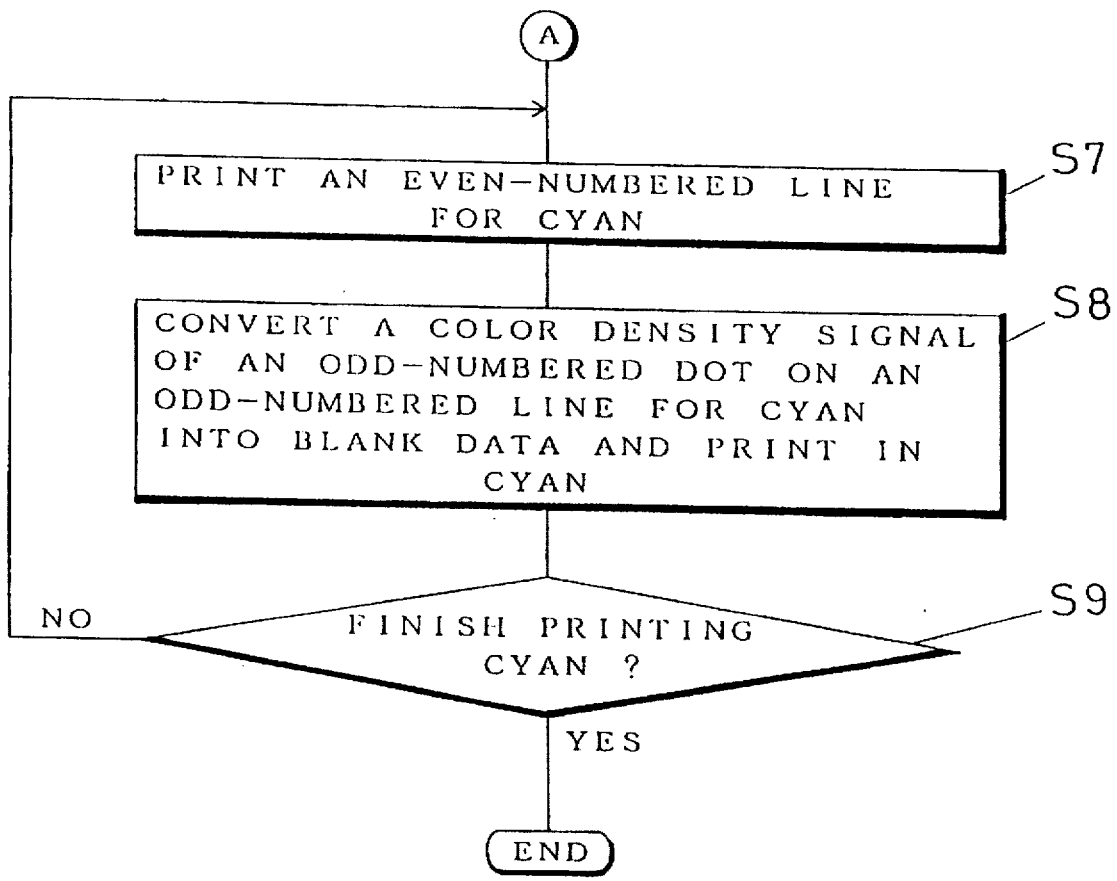
Figure 6:
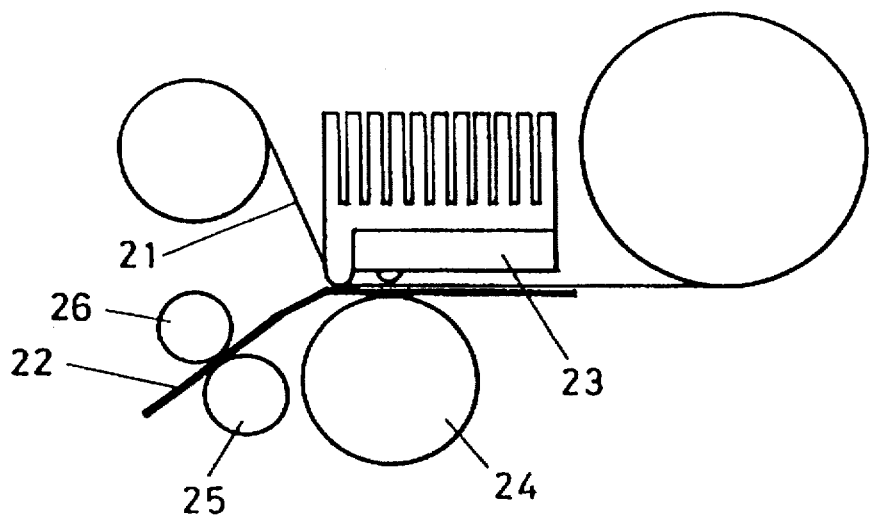
FIG. 6 is an explanatory diagram showing a printing mechanism of the thermal transfer recording apparatus.
Figure 7:
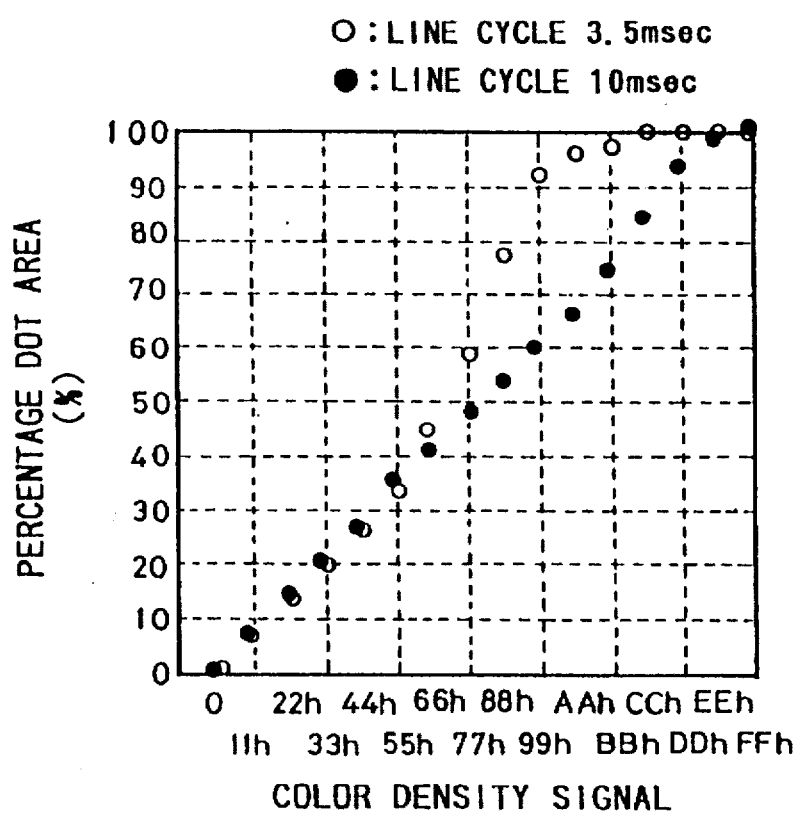
FIG. 7 is an explanatory diagram showing a density level characteristic of multi-density level printing by the conventional fusion type thermal transfer recording apparatus.
Figures 8A, 8B:
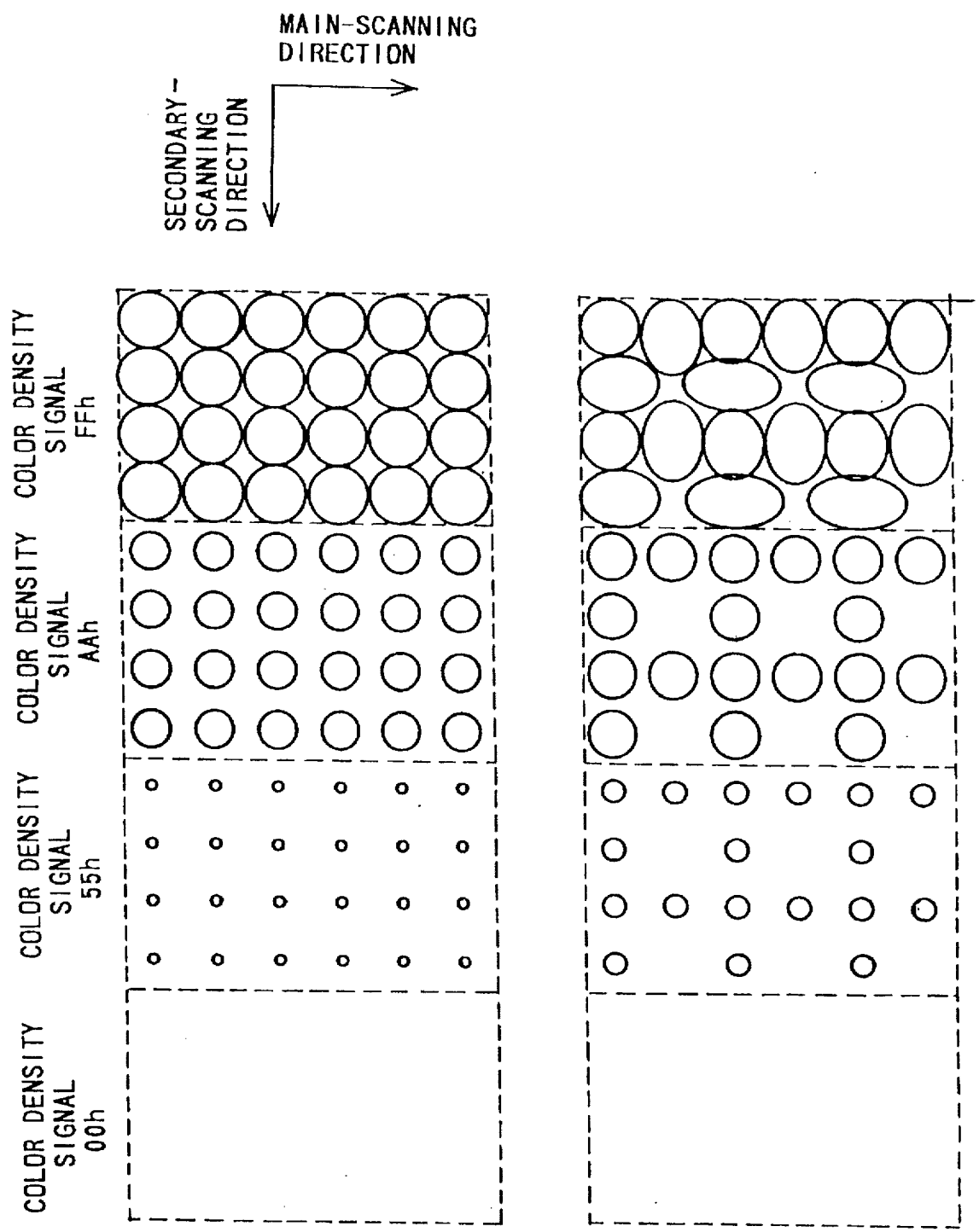
FIGS. 8A and 8B are is an explanatory diagrams showing a method for improving a density level characteristic of multi-density level printing by the conventional fusion type thermal transfer record device.

FIG. 4 shows a color development state of each dot which is observed when blue is displayed according to the present invention. Each dot is varied in size by varying an energizing pulse width of the thermal head, thereby printing in multi-color density levels and realizing multicolor expression.

In order to print blue, a dot in magenta is printed first, and then cyan is printed on the same dot to pile the cyan on the magenta, thereby forming a dot in blue by subtractive mixture of color stimuli.

According to the inventive thermal transfer recording apparatus and method, on the even-numbered lines such as line 0 and line 2, since all the dots in magenta and in cyan are printed, all the dots become blue. On the other hand, on the odd-numbered lines such as line 1 and line 3, among the even-numbered dots such as the dot 0, the dot 2, since the magenta dots are converted into blank data and are not printed, only the cyan dots are printed; among the odd-numbered dots such as the dot 1 and the dot 3, since the cyan dots are converted into blank data and are not printed, only the magenta dots are printed.

These cyan dots and magenta dots are different colors than blue when directing one's attention to the individual dots themselves. However, when taking a broad view of a printed image, a wavelength component is added to those dots, which are recognized as blue by additive mixture of color stimuli.

Due to the above phenomena, the blue printed by the subtractive mixture of color stimuli and the blue printed by the additive mixture of color stimuli are intermingled and all the dots look blue when taking an entire view of the printed image, and therefore there is no problem regarding a hue. Other hues can be also considered in the same way as described above, and there occurs no problem such as that a hue becomes out of order.

Though in the above embodiment the conversion table 12 is used to convert the color density signal into the print signal, it is also possible to control a gate circuit with the EVENLINE signal and the COLOR(1:0) signal so as to select whether the color density signal is output without conversion or whether it is converted into 00h.

Further, in this embodiment, while unprinted dots are determined for each color based upon logical combinations of one of the odd-numbered lines or even-numbered lines and one of the odd-numbered dots or even-numbered dots, however, the present invention is not limited to the above scheme. It goes without saying that the present invention covers also that a line among the plural lines and a dot among the plural dots are not printed.

Moreover, the present invention also contemplates that even if a dot display signal is not inputted into the table, the color density signal of the dot is automatically either converted into the print signal or not converted and outputted as it is just by inputting a line display signal.

The thermal transfer recording apparatus according to the present invention has the conversion means for receiving the line display signal which shows a line corresponding to a pixel that is indicated by the color density signal and an identification signal for each color, and for outputting the print signal for each color. Further, in the thermal transfer recording method according to the present invention, print information has a dot assigned not to be printed for each color, which differs depending on the respective color, and printing is done according to the print information. Because of such structures, the print signal to be converted has a dot which is not printed for each color and the unprinted dots differ depending on color. Therefore, there is no white dot on recording paper which is visually recognized as frequency noise, thereby realizing printing record of high quality.

What is claimed is:

1. A printing apparatus comprising: a color ink-containing medium; a printing head having a plurality of individually activatable printing elements; a mechanism for feeding a printing paper; a platen for pressing the printing paper against the printing head; means for receiving a color density signal containing print information, a line identification signal for identifying a line to which the color density signal corresponds, and a color identification signal for identifying a color to which the color density signal corresponds; conversion means for converting the color density signal into a print signal in accordance with the color identification signal, the print signal having one or more locations on selected lines at which no dot is to be printed for one or more selected colors even if the color density signal specifies that a dot is to be printed at the one or more locations, the one or more locations being dependent upon color; and a driving circuit for activating selected ones of the printing elements to coact with the color ink-containing medium to print dots on the printing paper in accordance with the print signal.

2. A printing apparatus according to claim 1; wherein the conversion means converts the color density signal into the print signal also in accordance with the line identification signal such that the one or more locations at which no dot is to be printed depend upon the line identified by the line identification signal.

3. A printing apparatus according to claim 1; wherein the line identification signal identifies whether the color density signal corresponds to an even-numbered line or to an odd-numbered line.

4. A printing apparatus according to claim 3; wherein the conversion means converts the color density signal into the print signal also in accordance with the line identification signal such that the one or more locations at which no dot is to be printed depend upon whether the line identified by the line identification signal is an even-numbered line or an odd-numbered line.

5. A printing apparatus according to claim 4; wherein the conversion means includes means for choosing between outputting the color density without conversion as the print signal and converting the color density signal into the print signal having one or more locations at which no dot is to be printed in accordance with the line identification signal and the color identification signal.

6. A printing apparatus according to claim 3; further comprising means for receiving a dot identification signal for identifying whether a pixel corresponding to the color density signal corresponds to an even-numbered dot or to an odd-numbered dot.

7. A printing apparatus according to claim 6; wherein the conversion means is responsive to the dot identification signal for determining the one or more locations at which no dot is to be printed in further accordance with the dot identification signal and the line identification signal.

8. A printing apparatus according to claim 1; further comprising means for receiving a dot identification signal for identifying whether a pixel corresponding to the color density signal corresponds to an even-numbered dot or to an odd-numbered dot.

9. A printing apparatus according to claim 8; wherein the conversion means is responsive to the dot identification signal for converting the color density signal into the print signal such that the one or more locations at which no dot is to be printed further depend upon the dot identification signal.

10. A printing apparatus according to claim 8; wherein the conversion means is responsive to both the line identification signal and the dot identification signal for converting the color density signal into the print signal.

11. A printing apparatus according to claim 1; wherein the conversion means is responsive to the line identification signal for determining the selected lines at which the print signal has one or more locations at which no dot is to be printed in accordance with the line identification signal and the color identification signal.

12. A printing apparatus according to claim 11; wherein the conversion means is responsive to the line identification signal for determining the selected lines at which the print signal has locations at which no dot is to be printed depending upon whether the line identified by the line identification signal is an even-numbered line or an odd-numbered line.

13. A printing apparatus according to claim 12; further comprising means for receiving a dot identification signal for identifying whether a pixel corresponding to the color density signal corresponds to an even-numbered dot or to an odd-numbered dot.

14. A printing apparatus according to claim 13; wherein the conversion means is further responsive to the dot identification signal for determining the one or more locations at which no dot is to be printed.

15. A printing apparatus according to claim 12; further comprising means for receiving a dot identification signal for identifying whether a dot corresponding to the color density signal is an even-numbered dot or an odd-numbered dot.

16. A printing apparatus according to claim 15; wherein the conversion means is further responsive to the dot identification signal for determining the one or more locations at which no dot is to be printed.

17. A printing apparatus according to claim 1; wherein the one or more locations at which no dot is to be printed are different for two or more different colors.

18. A printing apparatus according to claim 1; wherein the color ink-containing medium comprises an ink sheet feedable between the platen and the printing paper, the printing head comprises a thermal printing head, and the printing elements comprise heat generating resistive members.

19. A printing apparatus according to claim 1; wherein the conversion means includes means for converting the color density signal into the print signal such that the one or more locations at which not dot is to be printed on the printing paper depend upon whether a location of print information in the color density signal is an even-numbered location or an odd-numbered location.

20. A printing apparatus according to claim 19; wherein the conversion means converts the color density signal into the print signal also in accordance with the line identification signal such that the one or more locations at which no dot is to be printed depend further upon the line identified by the line identification signal.

21. A printing apparatus according to claim 20; wherein the conversion means comprises means for converting the color density signal into the print signal using a conversion table in which an output value is a value of the print signal and is dependent upon the color density signal, the color identification signal, and the line identification signal, and which further depends, for each successive dot of the print information in the print signal, on the location of print information contained in the color density signal.

22. A printing apparatus according to claim 1; wherein the conversion means comprises means for converting the color density signal into the print signal using a conversion table in which an output value is a value of the print signal.

23. A printing apparatus comprising: a color ink-containing medium; a printing head having a plurality of individually activatable printing elements; a mechanism for feeding a printing paper; a platen for pressing the printing paper against the printing head; means for receiving a color density signal containing print data for printing a series of dots on a selected line; masking means for masking one or more locations of the color density signal such that no printing is to occur at the one or more locations, the one or more locations being dependent upon color; and driving means for driving the printing head by activating selected ones of the printing elements to coact with the color ink-containing medium to print dots on the printing paper in accordance with an output signal of the masking means.

24. A printing apparatus according to claim 23; wherein the masking means includes means for determining the one or more locations at which no printing is to occur depending upon the value of the selected line.

25. A printing apparatus according to claim 24; wherein the masking means includes means for choosing between outputting the color density signal without conversion as the print signal and converting the color density signal into the print signal having one or more locations at which not printing is to occur in accordance with the color identification signal and the value of the selected line.

26. A printing apparatus according to claims 24; wherein the masking means includes means for determining the one or more locations at which no printing is to occur depending upon whether the selected line is an even-numbered line or an odd-numbered line.

27. A printing apparatus according to claim 24; wherein the masking means includes means for determining the one or more locations at which no printing is to occur depending upon whether a print data location of the color density signal is an even-numbered location or an odd-numbered location.

28. A printing apparatus according to claim 24; wherein the masking means includes means for determining the one or more locations at which no printing is to occur depending upon whether a location of a dot of the color density signal is an even-numbered location or an odd-numbered location.

29. A printing apparatus according to claim 23; further comprising means for receiving a line identification signal for identifying the selected line corresponding to the color density signal.

30. A printing apparatus according to claim 29; wherein the masking means includes means for determining the one or more locations at which no printing is to occur depending upon the line identified by the line identification signal.

31. A printing apparatus according to claim 29; further comprising means for receiving a dot identification signal for identifying whether a location of the color density signal corresponds to an even-numbered dot or to an odd-numbered dot.

32. A printing apparatus according to claim 31; wherein the masking means further comprises means for determining the one or more locations at which no printing is to occur depending upon the dot identification signal.

33. A method for multi-color printing comprising the steps of:

receiving print information for printing dots in a plurality of colors at specified locations on at least one line of a printing paper;

masking the print information for selected colors such that one or more dots are not to be printed at one or more selected locations on the at least one line; and printing in the plurality of colors on the at least one line of the printing paper;

wherein at least one of the one or more selected locations on the at least one line at which no dot is to be printed differ for two or more colors.

34. A method for multi-color printing according to claim 33; further comprising the step of specifying the one or more locations at which no dot is to be printed depending upon whether a selected line is an even-numbered line or an odd-numbered line.

* * * * *